Feb. 5, 1957 — J. C. EWART — 2,780,093
HYDRAULIC PIPE TESTING APPARATUS
Filed June 1, 1954 — 2 Sheets-Sheet 1
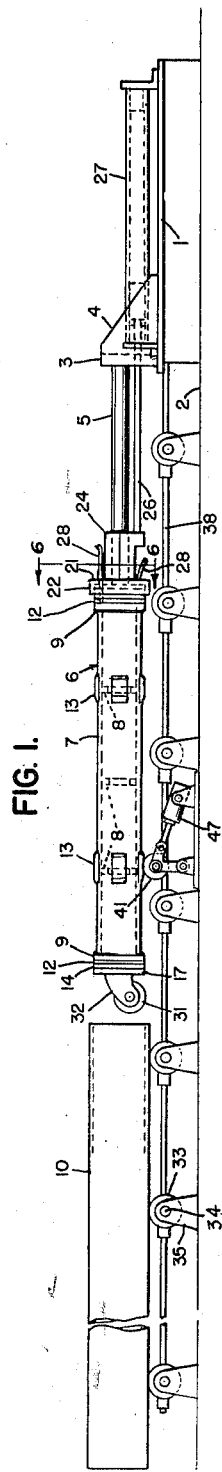
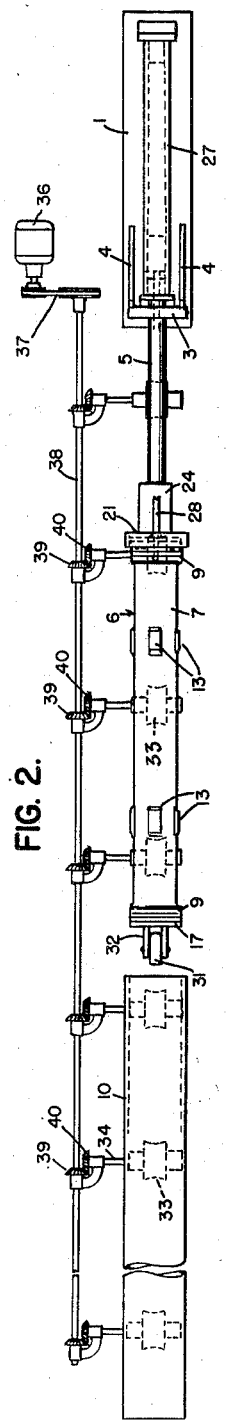
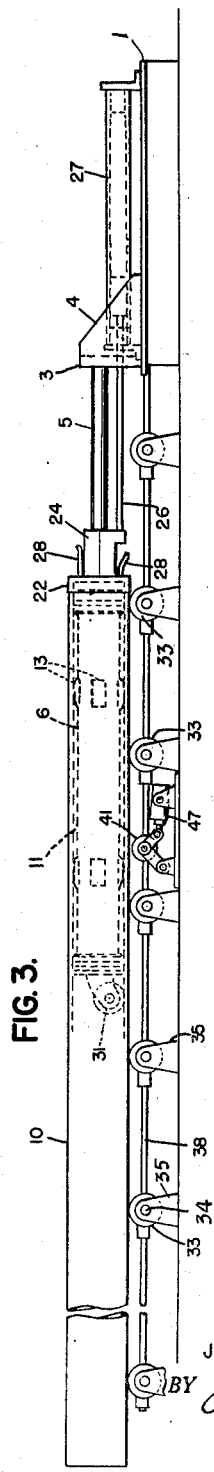
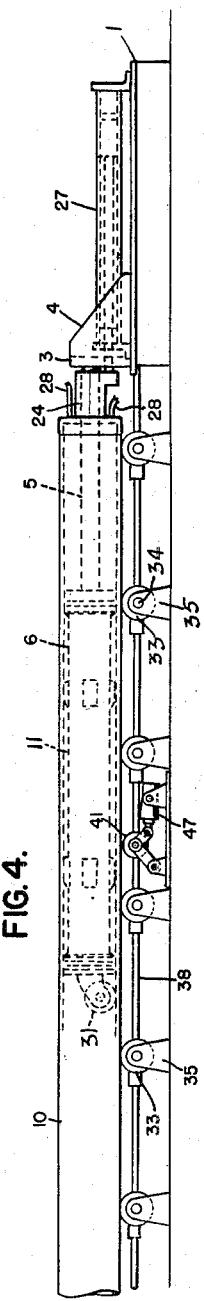
INVENTOR.
JOHN C. EWART
Attorneys Feb. 5, 1957 J. C. EWART 2,780,093
HYDRAULIC PIPE TESTING APPARATUS
Filed June 1, 1954 2 Sheets-Sheet 2

INVENTOR.
JOHN C. EWART
BY
Andrus & Seealer
Attorneys

United States Patent Office 2,780,093
Patented Feb. 5, 1957

2,780,093

HYDRAULIC PIPE TESTING APPARATUS

John C. Ewart, Milwaukee, Wis., assignor to A. O. Smith Corporation, Milwaukee, Wis., a corporation of New York Application June 1, 1954, Serial No. 433,429

9 Claims. (Cl. 73—49.6)

This invention relates to a pipe testing apparatus and more particularly to a hydraulic apparatus for testing long lengths of substantially large diameter pipe.

In the past, large diameter pipe has been tested for structural defects by capping the ends and applying fluid pressure within the pipe. This method requires large quantities of fluid to fill the pipe and the filling and draining operations take a considerable period of time. In addition, the pressure exerted by the fluid against the end caps of the pipe is of considerable magnitude, and an external force is thereby usually applied to the caps to counteract the longitudinal force of the fluid within the pipe acting against the caps. This external counteracting force, if improperly controlled, may cause a buckling of the pipe which destroys the dimensions of the pipe and its usefulness.

With the use of the above method of testing it was not practical to test long lengths of pipe because of the quantities of water involved and the excessive longitudinal pressures exerted by the fluid within the pipe.

The present invention is directed to a hydraulic pipe testing apparatus which is of inexpensive design and is capable of testing long lengths of substantially large diameter pipe with a minimum use of fluid.

More specifically, the testing apparatus consists of a frame which supports a generally cylindrical core. An annular resilient seal is disposed circumferentially of the core at each end thereof. An end portion of the pipe to be tested is disposed around the core and spaced outwardly from the core to provide an annular chamber therebetween. Fluid pressure is introduced into the chamber and acts against the seals at the ends of the core to force the seals outwardly against the pipe to provide a sealed, fluid-tight chamber. After testing, the pipe is moved forwardly on the core to dispose a second portion of the pipe between the seals. This second portion of the pipe is tested in a manner similar to that of the first portion. After the second portion of the pipe has been tested, the pipe is withdrawn from the core, reversed, and the opposite end portion of the pipe disposed around the core. The untested portion of the core is then tested in increments similar to that employed with the portion of the pipe first tested.

The invention incorporates a seal depresser to depress a seal at the rear end of the core to permit the leading end of the pipe to pass over the seal. The seal depresser is slidably mounted with respect to the core, and the leading end of the pipe engages the seal depresser and moves it rearwardly out of engagement with the seal. The seal depresser is adapted to move rearwardly a distance equivalent to approximately one-half the length of the pipe so that at least one-half of the pipe may be disposed around the core and tested.

The seal depresser is biased forwardly so that it will automatically return to engage the seal at the rear end of the core when the pipe is withdrawn from the core.

The present pipe testing apparatus is of an inexpensive design as no yokes or tie rods are required, and a simple foundation may be employed because of the low weight of the machine. As the high pressure fluid is confined to the annular chamber between the core and the pipe, only a small amount of fluid is required and the fluid can be introduced and withdrawn from the chamber in an extremely short period of time.

As the testing fluid is confined to the annular chamber and thereby occupies only a small proportion of the cross sectional area of the pipe, the longitudinal force of the fluid is minimized and the need for a counteracting force on the end caps is eliminated. By eliminating the counteracting force the problem of pipe buckling is overcome.

The present apparatus permits long lengths of pipe to be tested on a relatively small apparatus, for the pipe is ordinarily tested in four increments and thus the machine need only be slightly more than one-quarter to one-third of the length of the pipe to be tested.

The drawings furnished herewith illustrate the best mode of carrying out the invention as presently contemplated and set forth hereinafter.

In the drawings:

Fig. 1 is a side elevation of the apparatus with the pipe to be tested supported on rollers prior to being disposed on the core;

Fig. 2 is a plan view of the apparatus as shown in Fig. 1;

Fig. 3 is a side elevation showing the first increment of the pipe in position on the core;

Fig. 4 is a side elevation showing the second increment of the pipe in position on the core;

Figure 5:
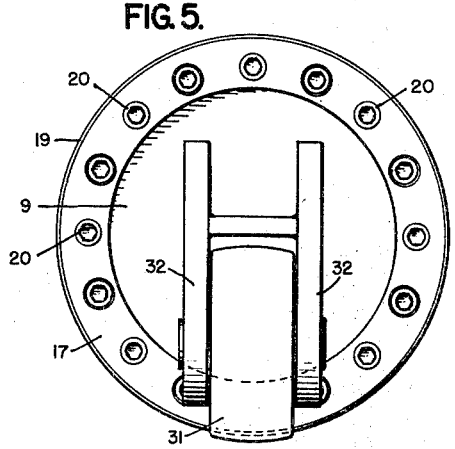
Fig. 5 is an end elevation of the apparatus as viewed from the left in Figure 1.

As shown in the drawings, the pipe testing apparatus of the present invention comprises a frame 1 which is supported on a foundation 2. The frame includes a generally vertical shaft support plate 3 which is reinforced by webs 4. One end of a shaft 5 is secured to support plate 3 and the shaft extends outwardly therefrom in a generally horizontal plane. The opposite or forward end of the shaft 5 supports a generally cylindrical core 6.

The core 6 consists of a shell 7 which is reinforced at spaced intervals throughout its length by circular webs 8. The ends of shell 7 are enclosed by end caps 9 which are welded to the shell. The forward end of shaft 5 is secured by welding to the rear end cap 9.

A pipe 10 to be tested is adapted to be fed onto the core 6. The outer diameter of core 6 is slightly less than the internal diameter of pipe 10 so that the core 6 will be spaced inwardly of the pipe to provide an annular chamber 11 between the pipe 10 and core 6. Fluid pressure is introduced within chamber 11 to test the portions of the pipe disposed around core 6 for structural defects.

Figure 9:
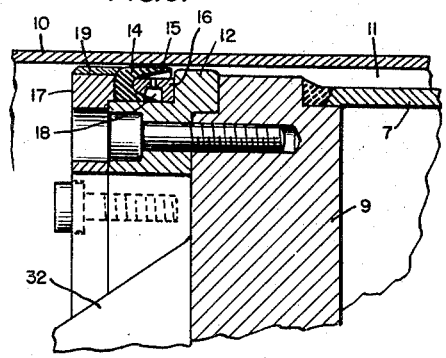
Fig. 9 is an enlarged fragmentary section showing the seal at the forward end of the core.
Figure 10:
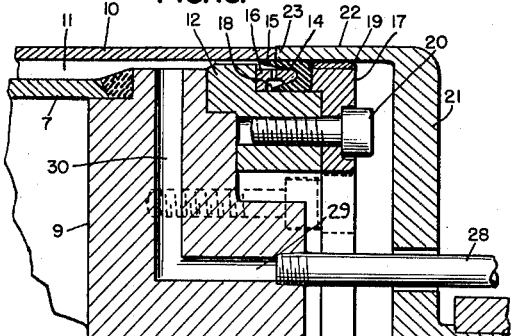
Fig. 10 is an enlarged fragmentary sectional view showing the seal at the rearward end of the core.
Figure 11:
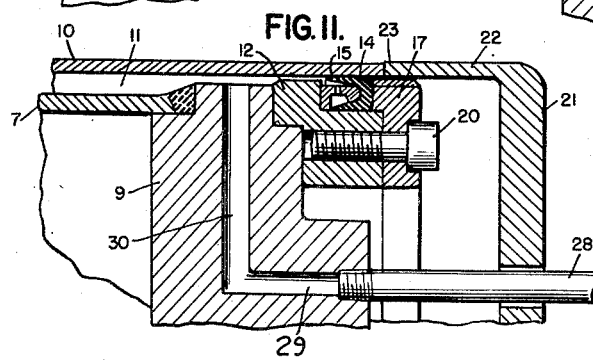
Fig. 11 is a view similar to Fig. 10 showing the seal depresser displaced rearwardly by the pipe.

The pipe 10 is guided onto core 6 and centered thereabout by a pair of guide rings 12 which are disposed at each end of the core and bear against the respective end caps 9. This is best shown in Figs. 9, 10 and 11. The rings 12 are bolted to caps 9.

The rings 12 are each provided with an enlarged diameter guide portion having an external diameter slightly less than the internal diameter of pipe 10. The guide portions of rings 12 serve to center the pipe on core 6 and provide chamber 11 with a uniform radial dimension so that the fluid pressure within chamber 11 acts equally against all portions of the pipe.

The pipe 10 is also guided in movement on core 6 by a series of guides 13 which are secured at spaced intervals to the outer surface of shell 7. Guides 13 are also provided with beveled approach edges and serve to center the pipe around the core.

Chamber 11 is sealed at the ends of the core by annular resilient seals 14 which are disposed around the guide rings 12. The seals 14 are provided with lips 15 which extend angularly outwardly from the body of the seal toward a transverse plane passing through the longitudinal center of the core 6. The diameter of the lip 15 is slightly greater than the internal diameter of pipe 10 so that the lip will be biased inwardly by the pipe when the pipe is disposed circumferentially to the core.

Each of the seals 14 is secured against longitudinal movement by a packing ring 16 and an outer retaining ring 17. The packing ring 16 has a generally channel-shaped cross section and defines a chamber 18 between the packing ring and the base of the seal 14. A series of openings formed in the web portion of the packing ring provide communication between chamber 11 and chamber 18.

Fluid pressure introduced within chamber 11 acts against the lip 15 of the seal to force the lip outwardly into a tight sealing engagement with the pipe. In addition, the fluid pressure acts within chamber 18 against the base of the seal 14 to insure a tight sealing engagement between the base of the seal and guide ring 12.

The retaining ring 17 secures the seal 14 against outward longitudinal movement. In addition, the outer surface 19 of retaining ring 17 serves as a bearing surface and guide for the pipe passing around core 6. The outer bearing surface 19 of retaining ring 17 may be covered with bronze or other wear-resistant metal. Retaining ring 17 is bolted to the respective guide ring 12 by bolts 20.

As the lips 15 of the seals 14 project outwardly beyond the core, the lip of the rear seal is depressed in order to permit the pipe to pass over the seal. The rear seal 14 is adapted to be depressed by a depresser unit which includes a circular plate 21 which is slidably mounted on shaft 5. An annular flange 22 is provided on the periphery of plate 21 and flange 22 extends forwardly of the plate around the retaining ring 17. The flange 22 is adapted to circumferentially engage the rear seal 14 and depress the lip of the seal so that the pipe 10 to be tested can pass over the seal. The forward edge 23 of flange 22 is provided with a blunt contour and is adapted to be engaged by the leading edge of the pipe 10 as the pipe is fed onto the core.

Figure 6:
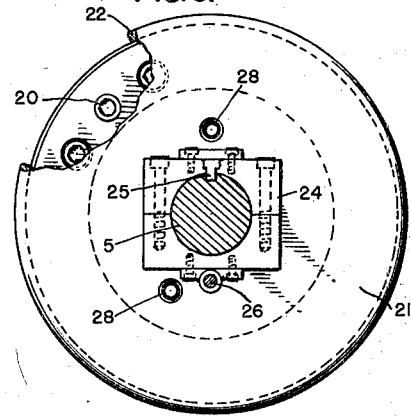
Fig. 6 is a sectional view taken along line 6—6 of Figure 1.
Figure 7:
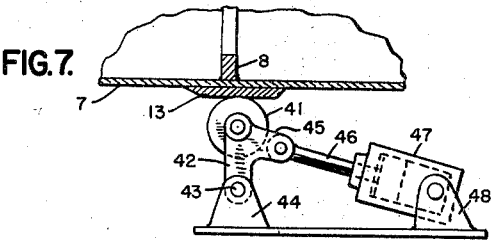
Fig. 7 is an enlarged sectional view of the supporting apparatus for the core.
Figure 8:
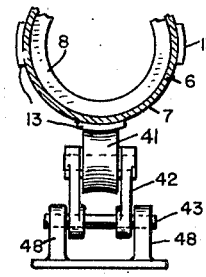
Fig. 8 is a transverse section of the supporting apparatus of Fig. 7.

The seal depresser unit is slidably mounted on shaft 5 by means of a bearing block 24 which is connected to plate 21 and is slidably keyed at 25 to shaft 5, see Fig. 6. As the depresser unit is slidably mounted on shaft 5, the depresser unit will be pushed rearwardly by the engagement of the leading end of the pipe 10 with the flange 22.

The depresser unit is biased forwardly on shaft 5 so that the flange 22 will return to engagement with rear seal 14 when the pipe 10 is withdrawn from the core 6. To bias the depresser unit forwardly, bearing block 24 is connected to piston rod 26 of an air cylinder 27. The depresser unit is moved rearwardly by the pipe 10 against the pressure in cylinder 27. When the pipe 10 is withdrawn from the core, the pressure within cylinder 27 will move the depresser unit forwardly to effect engagement of flange 22 with the rear seal 14.

To supply and withdraw fluid pressure from chamber 11, a pair of conduits 28, which communicate with a source of fluid pressure, not shown, are attached to the rear end cap 9. Each of the conduits 28 communicates with a longitudinal passage 29 formed in cap 9, and each of the passages 29 in turn communicates with a radial passage 30 which extends outwardly to chamber 11. Fluid pressure is introduced through one of the conduits 28 and passes through the corresponding passages 29 and 30 to chamber 11. The pressure within chamber 11 acts outwardly against the pipe to test the same for structural defects. On completion of this testing operation the fluid within chamber 11 is withdrawn through the other of the passages 29 and 30 and conduit 28.

To permit the depresser unit to slide rearwardly on shaft 5, the conduits 28 pass through suitable openings in the plate 21 and extend generally co-extensively with shaft 5 to frame 1. By this construction the seal depresser unit can move relative to the conduits 28.

It is contemplated that the pipe be tested in increments of one-quarter to one-third of its length. By this method of an end portion of the pipe is disposed around the core and this one-quarter to one-third length is tested. After testing, the pipe is moved rearwardly pushing the seal depresser unit ahead of it until a second length of pipe is disposed about the core in position to be tested. An amount of overlap is contemplated so that all portions of the pipe will be tested.

After testing of this second length, the pipe is removed from the core, reversed, and the opposite end of the pipe is introduced onto the core. The untested second portion of the pipe is then tested in two increments in a manner similar to that of the first one-half of the pipe.

To guide and center the pipe 10 on core 6 a roller 31 is journaled within brackets 32 which extend outwardly and downwardly from the forward end cap 9. The roller 31 is adapted to ride on the internal surface of the pipe and aids in centering the pipe on the core.

The pipe 10 is supported by and conveyed onto the core by a plurality of spaced power-driven rollers 33 which are aligned beneath core 6 and shaft 5. Each of the rollers 33 is secured to a shaft 34 which is journaled within a bearing block 35. Bearing blocks 35 are supported on foundation 2. The rollers 33 are driven by a motor 36 which is connected by drive belt 37 to the longitudinal shaft 38. A plurality of bevel gears 39 are mounted in spaced relation on shaft 38 and are adapted to mesh with gears 40 secured to the roller shafts 34. By this connection, rotation of longitudinal shaft 38 by motor 36 effects a simultaneous rotation of rollers 33 to move the pipe in relation to the core 6.

When the pipe 10 is not in circumferential relation to the core, the forward end of core 6 is supported by a support roller 41 which is rotatably secured between the upper ends of spaced arms 42. The lower end of arms 42 are pivotally secured to shaft 43 which is supported between the upstanding spaced supports 44.

The arms 42 are provided with outwardly extending ears 45, and the piston rod 46 of an air cylinder 47 is pivotally secured between the ears 45. Cylinder 47 is pivotally mounted between brackets 48 which are secured to foundation 2.

When the piston rod 46 is in the extended position, the arms 42 are substantially vertical and the surface of the roller is disposed slightly above the surface of conveyor rollers 33 and in position to support core 6.

As the pipe is moved onto the core 6, the leading end of the pipe passes between the core and the conveyor roller 33 disposed beneath the forward end of the core. When the leading end of the pipe reaches this position a solenoid or other electro-magnetic means, not shown, is energized which actuates air cylinder 47 and draws piston rod 46 downwardly therein, thereby pivoting arms 42 about shaft 43 and moving roller 41 out of contact with core 6.

On withdrawal of pipe 10 from the core the solenoid is de-energized when the leading end of the pipe passes above the roller 33 disposed beneath the forward end of the core, thereby actuating air cylinder 47 and moving the piston rod 46 outwardly to pivot arms 42 and roller 41 upwardly into engagement with core 6.

In operation of the present apparatus the pipe 10 to be tested is initially placed on the series of conveyor rollers 33 by a chain hoist or the like. The motor 36 is then operated to feed the pipe onto the core 6.

As the leading end of the pipe passes above the roller 33 disposed beneath the forward end of the pipe, the solenoid is energized to actuate cylinder 47 and pivot support roller 41 downwardly out of contact with the core. The pipe and the core are then supported by the rollers 33.

The pipe 10 moves rearwardly with the leading end thereof engaging the surface 23 of the flange 22 of the seal depresser unit. When the flange 22 has been moved rearwardly out of engagement with the rear seal 14 by pipe 10, the motor is stopped.

Fluid pressure is then introduced into chamber 11 through conduits 28 and passages 29 and 30 to test the portion of the pipe located between the seals 14. After this portion of the pipe has been tested and the fluid pressure withdrawn from chamber 11, the pipe is again moved rearwardly through operation of motor 36 until a second increment is positioned between the seals 14. The motor is again stopped and this portion of the pipe is subjected to the high fluid pressure test. In this position of pipe 10, the seal depresser unit has been pushed rearwardly by the leading end of the pipe and is disposed adjacent the supporting plate 3 of frame 1.

After the second increment of the pipe has been tested, the pipe is withdrawn from the core by operation of motor 36 and the seal depresser unit follows up the movement of the pipe due to the pressure exerted by air cylinder 27. As the leading end of the pipe passes above the conveyor roller 33 disposed beneath the forward end of the core 6, the electromagnetic circuit is de-energized to actuate cylinder 47 and pivot arms 42 and roller 41 upwardly. The support roller 41 then supports the core 6.

The pipe is then reversed on the conveyor rollers 33 and the opposite untested end of the pipe is then fed onto the core 6. The second untested portion of the pipe is then tested in a manner similar to that of the first half.

As the present apparatus is adapted to test long lengths of pipe in small increments, the testing apparatus can be of a smaller inexpensive design than the conventional types of pipe testers. The decreased size of the apparatus results in lower weight and eliminates the necessity for costly supports and foundations.

As the fluid pressure is confined to the chamber 11 rather than being introduced within the entire interior of the pipe, only a small amount of fluid is required for testing and the fluid can be introduced and withdrawn from the chamber in a short period of time. This time saving speeds up the entire production of pipe.

In the conventional testing apparatus wherein the fluid is disposed within the entire interior of the pipe, substantial longitudinal forces are exerted against the end caps. However, in the present apparatus, as the fluid is contained only within the annular chamber 11 and thereby occupies only a small portion of the cross sectional area of the pipe, the longitudinal force of the fluid is minimized and the need for an outer counteracting force on the end caps is eliminated.

The present invention also provides a novel method of sealing the ends of the pressure chamber 11. The sealing is accomplished through the use of a pair of pressure seals whereby the sealing engagement is increased in proportion to the magnitude of pressure in the chamber. The seal depresser unit serves to permit the pipe to pass over both of the seals without injuring or damaging the same by automatically depressing the seal at the rear end of the core whenever the pipe is withdrawn from the core.

Various modes of carrying out the invention may be employed within the scope of the accompanying claims which particularly point out and distinctly set forth the subject matter regarded as the invention.

I claim:

1. An apparatus for testing tubular members, comprising a frame, a cylindrical core extending outwardly from the frame and adapted to circumferentially receive a tubular member to be tested, said member being spaced outwardly from the core to provide an annular chamber between the core and the member, an annular resilient sealing member disposed at each end of the core and adapted to bear against the pipe for sealing the ends of the chamber against internal fluid pressure, an annular seal protector disposed at the rearward end of the core adjacent the frame to depress the sealing member at said rearward end until the tubular member is circumferentially disposed with respect to the rearward sealing member, said seal protector being disposed radially outward of the sealing member in position to be engaged by the end of the tubular member and moved rearwardly out of engagement with the sealing member, means for moving the tubular member onto the forward end of said core prior to testing and for withdrawing the member from said core after the testing has been completed, and means for introducing a high pressure into said chamber to test the portion of the tubular member disposed between the sealing members for structural defects.

2. An apparatus for testing pipe, comprising a frame, a generally cylindrical core extending forwardly from the frame and adapted to circumferentially receive the pipe to be tested and having a diameter slightly less than the internal diameter of the pipe to provide an annular chamber therebetween, an annular resilient seal disposed circumferentially of the core at each end thereof, each of said seals extending angularly outwardly from the core in a direction toward a transverse plane passing through the longitudinal center of the core and being adapted to engage the pipe to seal the chamber against internal pressure, an annular seal protector disposed in circumferential engagement with the seal at the rearward end of said core to depress the seal radially inwardly and decrease the diameter of said seal to an amount less than the internal diameter of the pipe to be subsequently received on said core, means for feeding said pipe onto the forward end of said core and moving the pipe rearwardly on said core with the leading end of the pipe engaging said seal protector, means for slidably mounting said seal protector with respect to said core to permit said protector to be moved rearwardly out of engagement with the seal by the leading end of said pipe and effect an engagement of the seal with the pipe, means for introducing a high pressure fluid into said chamber to test the portion of the pipe disposed between the seals for defects and for withdrawing the pressure from the chamber on completion of the testing, and means for returning said seal protector into engagement with the seal at the rearward end of the core on withdrawal of the pipe from said core.

3. An apparatus for testing pipe, comprising a frame, a generally cylindrical core extending outwardly from the frame in a generally horizontal plane and adapted to circumferentially receive a pipe to be tested with the internal diameter of said pipe being slightly greater than the external diameter of the core to provide an annular chamber therebetween, a resilient seal disposed around the outer surface of the core adjacent each end thereof, an annular movable seal protector disposed circumferentially of the rear end portion of the core adjacent the frame and adapted to circumferentially engage and depress the seal adjacent said rear end portion, drive means for feeding the pipe to be tested longitudinally onto the forward end of said core with the leading end of said pipe engaging said seal protector and moving the same out of engagement with the seal, the ends of said chamber then being closed off by the engagement of said seals with the inner surface of said pipe, means for introducing a high pressure fluid into said chamber to test the portion of the pipe disposed between said seals and for withdrawing said pressure from said chamber after completion of the testing, means for withdrawing the pipe from the core on completion of testing, and means for biasing said seal protector forwardly away from said frame to return said seal protector into circumferential engagement with the seal at the rearward end of said core after withdrawal of the tubular member from the core.

4. An apparatus for testing pipe comprising a frame, a generally cylindrical core extending outwardly from the frame and adapted to circumferentially receive the pipe to be tested and having a diameter slightly less than the internal diameter of the pipe to provide an annular chamber therebetween, an annular resilient seal disposed circumferentially of the core at each end thereof and adapted to bear against the pipe to seal said chamber against internal fluid pressure, means for introducing a high pressure fluid into said chamber to test the portion of the pipe disposed between the seals and to withdraw the fluid after completion of testing, conveying means aligned with said core with a portion of said conveying means being disposed beneath said core, said conveying means serving to support and convey the pipe onto the core for testing and withdraw the pipe from the core on completion of testing, a supporting member for supporting the core prior to the introduction of the pipe onto said core, and means connected to the supporting member for withdrawing the supporting member as the leading end of the pipe is fed onto the core with the core then being supported by the conveying means and for returning the supporting member into engagement with the core as the leading end of the pipe is withdrawn from the core.

5. An apparatus for testing tubular members, comprising a frame, a shaft extending outwardly from the frame in a generally horizontal plane, a generally cylindrical core secured to the outer end of the shaft and disposed in axial alignment therewith, said core being adapted to circumferentially receive an end portion of said tubular member with said tubular member being outwardly spaced from said core to provide an annular chamber therebetween, an annular resilient pressure seal disposed at each end of the core to bear against the tubular member and seal off the chamber against internal fluid pressure, said seal being adapted to be forced outwardly into a tight sealing engagement with the pipe by the fluid pressure within the chamber, an annular seal protector slidably mounted on said shaft and biased forwardly away from said frame to engage and depress the seal at the rearward end of the core to permit the tubular member to be received therearound, drive means for moving said tubular member onto the forward end of said core and for stopping movement of said tubular member after the leading edge of said tubular member engages said seal protector and moves said seal protector rearwardly out of engagement with the corresponding seal with said tubular member then being disposed circumferentially of said seal, and means for introducing high pressure fluid into said chamber to test the portion of the tubular member disposed between said seals for structural defects and for withdrawing the pressure on completion of testing, said drive means serving to move the tubular member rearwardly toward said frame against the biasing force on said seal protector after testing of said portion of said tubular member to dispose a second portion of said tubular member between said seals in position for testing.

6. An apparatus for testing pipe, comprising a frame, a generally cylindrical core extending outwardly from the frame and adapted to circumferentially receive the pipe to be tested and having a diameter slightly less than the internal diameter of the pipe to provide an annular chamber therebetween, an annular resilient seal disposed circumferentially of the core at each end thereof and being adapted to bear against the pipe to seal said chamber against internal fluid pressure, means for introducing a high pressure fluid into said chamber to test the portion of the pipe disposed between the seals and to withdraw the fluid after completion of testing, conveying means aligned with said core with a portion of said conveying means disposed beneath said core, said conveying means serving to support and convey the pipe onto the core for testing, a supporting member disposed at the forward end of the core for supporting the core prior to feeding the pipe onto said core, and means connected to the supporting member for withdrawing the supporting member from the core when the leading end of the pipe passes a predetermined position between the forward end of the core and said supporting member with the core then being supported by the conveying means.

7. An apparatus for testing pipe, comprising a frame, a generally cylindrical core extending outwardly from the frame and adapted to circumferentially receive the pipe to be tested and having a diameter slightly less than the internal diameter of the pipe to provide an annular chamber therebetween, an annular resilient seal disposed circumferentially of the core at each end thereof and adapted to bear against the pipe to seal said chamber against internal fluid pressure, means for introducing a high pressure fluid into said chamber to test the portion of the pipe disposed between the seals and to withdraw the fluid after completion of testing, a series of conveyor rollers aligned with said core for supporting said pipe with a roller of said series disposed beneath the forward end of the core, a supporting member disposed beneath the core rearwardly of said roller for supporting the core, means for moving said pipe on said series of rollers to feed the pipe onto the forward end of said core for testing and for withdrawing the pipe from the core on completion of testing, and means connected to the supporting member for withdrawing the supporting member when the leading end of the pipe passes between the core and said roller with the core then being supported by said roller and for returning the supporting member into engagement with the core when the leading end of the pipe passes between the core and said roller on withdrawal of the pipe from the core.

8. An apparatus for testing tubular members, comprising a frame, a shaft extending outwardly from the frame in a generally horizontal plane, a generally cylindrical core secured to the outer end of the shaft and disposed in axial alignment therewith, said core being adapted to circumferentially receive an end portion of said tubular member with said tubular member being spaced outwardly from said core to provide an annular chamber therebetween, an annular resilient seal disposed circumferentially of the core at each end thereof, each of said seals extending angularly outward from the core in a direction toward a transverse plane passing through the longitudinal center of the core and adapted to engage the pipe to seal the chamber against internal pressure, an annular seal protector slidably mounted on said shaft and disposed in circumferential engagement with the seal at the rearward end of said core to depress the seal radially inwardly and decrease the outer diameter of the seal to an amount less than the internal diameter of the pipe to be subsequently received on the core, means for feeding said pipe onto the forward end of said core and moving the pipe rearwardly on said core with the leading end of the pipe engaging said seal protector and moving the same rearwardly out of engagement with the seal with said seal then engaging said pipe, and conduit means extending substantially coextensively of said shaft and communicating with said chamber for introducing a high pressure fluid into said chamber to test the portion of the pipe disposed between the seals for defects and for withdrawing the pressure from the chamber on completion of the testing, said conduit means extending freely through said seal protector to permit said seal protector to be moved relatively to said conduit means.

9. An apparatus for testing pipe comprising a frame, a generally cylindrical core extending forwardly of the frame and adapted to circumferentially receive the pipe to be tested and having a diameter slightly less than the internal diameter of the pipe to provide an annular chamber therebetween, a guide member secured to each end of the core and having an enlarged guiding portion formed with a diameter greater than said core and smaller than the internal diameter of said pipe to aid in centering the pipe on the core and provide the chamber with a substantially uniform radial dimension, an annular resilient seal disposed circumferentially of each of the guide members adjacent said guiding portion and having a base portion disposed in engagement with said guide member and an outer lip extending angularly outward from the base in a direction toward a transverse plane passing through the longitudinal center of the core and being adapted to bear against the pipe to seal the chamber against internal pressure, a seal protector disposed adjacent the rearward end of the core and having an annular peripheral flange extending forwardly therefrom to circumferentially engage the lip of the seal at the rearward end of the core and decrease the outer diameter of said seal to an amount less than the internal diameter of the pipe to be subsequently received on said core, means for feeding said pipe onto the forward end of said core and moving the pipe rearwardly on said core with the leading end of the pipe engaging said seal protector and moving said seal protector rearwardly out of engagement with the lip of said seal, means for introducing a high pressure fluid into said chamber to test the portion of said pipe disposed between said seals for structural defects and for withdrawing said fluid pressure on completion of testing, means for withdrawing the pipe from the forward end of the core on completion of testing, and means for biasing the seal protector forwardly with respect to the core to return said flange into circumferential engagement with the lip of the seal at the rear end of the core on withdrawal of the pipe from the core.

References Cited in the file of this patent

UNITED STATES PATENTS

| | | |
|---|---|---|
| 2,479,847 | Longley | Aug. 23, 1949 |
| 2,481,013 | Henderson | Sept. 6, 1949 |
| 2,493,061 | Devine et al. | Jan. 3, 1950 |
| 2,610,691 | Berry | Sept. 16, 1952 |
| 2,652,717 | Bush et al. | Sept. 22, 1953 |

FOREIGN PATENTS

| | | |
|---|---|---|
| 598,160 | Germany | June 6, 1934 |
| 635,735 | Great Britain | Apr. 12, 1950 |